United States Patent
Stehle et al.

[15] 3,644,262
[45] Feb. 22, 1972

[54] PROCESS FOR INCREASING THE ETHYLENE CONTENT OF VINYL ACETATE-ETHYLENE EMULSION COPOLYMERS

[72] Inventors: Peter Fallon Stehle, Media; Chan K. Wu, Philadelphia, both of Pa.; Samuel Loshaek, Stamford, Conn.; Jack Dickstein, Huntingdon Valley, Pa.

[73] Assignee: Borden Inc., New York, N.Y.

[22] Filed: Nov. 5, 1969

[21] Appl. No.: 874,410

[52] U.S. Cl. .................. 260/29.6 R, 260/17 A, 260/17.4 ST, 260/29.6 RB, 260/29.6 RW, 260/29.6 WA
[51] Int. Cl. ........................................................ C08f 45/22
[58] Field of Search ................... 260/29.6 R, 87.3 R, 29.6 RB

[56] References Cited

UNITED STATES PATENTS

| | | | |
|---|---|---|---|
| 2,703,794 | 3/1955 | Roedel | 260/29.6 R |
| 3,325,460 | 6/1967 | Shellenberg et al. | 260/87.3 R |
| 3,483,171 | 12/1969 | Kühlramp et al. | 260/87.3 R |
| 3,532,658 | 10/1970 | Gintz | 260/29.6 R |

FOREIGN PATENTS OR APPLICATIONS

| | | |
|---|---|---|
| 1,117,711 | 4/1968 | Great Britain |

*Primary Examiner*—Harold D. Anderson
*Attorney*—George P. Maskas and Edward Mandell

[57] ABSTRACT

This invention relates to copolymerizing vinyl acetate and ethylene in aqueous emulsion in contact with a pressurized ethylene gas phase and in particular to a method of copolymerizing substantially larger amounts of ethylene into the copolymer than have heretofore been copolymerized at equivalent temperature and pressure, said method comprising adding vinyl acetate to an aqueous emulsifying composition containing initiator and maintained under ethylene pressure, the rate of vinyl acetate addition during copolymerization being such as to maintain the concentration of unpolymerized vinyl acetate at a level not exceeding about 3.5 percent by weight of the aqueous emulsifying composition. The resulting latexes of this invention are useful as adhesives and bases for paints and paper coatings.

5 Claims, No Drawings

PROCESS FOR INCREASING THE ETHYLENE CONTENT OF VINYL ACETATE-ETHYLENE EMULSION COPOLYMERS

BACKGROUND OF THE INVENTION

Vinyl acetate ethylene copolymers, particularly in latex form, have been found to be very suitable as bases for paints, paper coatings and the like, as well as for adhesives. However, a complication in the manufacture of such latexes arises from the necessity of using excessively high pressures in order to incorporate sufficiently high quantities of ethylene in the copolymers. While some improvements in this field have been made, the best results thus far disclosed are obtained by methods which still require pressures so high that special pressure-resistant equipment is necessary in order to obtain levels of ethylene needed for desired end use. Typically, the most satisfactory procedures of the prior art attain incorporation of 20 percent by weight ethylene in ethylene vinyl acetate copolymer by using ethylene pressures higher than 500 p.s.i., whereas at 150 p.s.i. these prior art procedures yield copolymers with an ethylene content of only about 5 percent. Such low contents of ethylene are not sufficient for many end uses of the copolymers as in certain adhesives and coatings.

SUMMARY OF THE INVENTION

A means has now been found of copolymerizing substantially larger amounts of ethylene into an emulsion copolymer with vinyl acetate than have heretofore been obtained at equivalent temperature and pressure. Briefly stated, this invention comprises maintaining ethylene pressure and adding vinyl acetate to an aqueous emulsifying composition containing initiator at a rate such as to maintain the concentration of unpolymerized vinyl acetate at a level not exceeding about 3.5 percent and preferably not exceeding 1 percent by weight of aqueous emulsifying composition. Preferably the quantity of vinyl acetate does not exceed said level during the polymerization of a major portion of said copolymer in the emulsion and particularly of at least 75 percent of said copolymer. Surprisingly, this invention has made possible the incorporation of up to about 20 percent by weight of ethylene in the copolymer at 20° C. and 150 p.s.i., conditions under which only about 5 percent ethylene has been attainable using procedures of the prior art. Furthermore, latexes prepared by the new procedure of this invention, having concentrations as high as up to about 60 percent by weight, have proved to be colloidally stable for periods up to two years without coagulation or gelation.

DETAILED DESCRIPTION

To attain maximum capture of monomeric ethylene by the copolymerizing monomeric vinyl acetate, it is reasonable to strive for optimum availability of said ethylene to said vinyl acetate. In the prior art, such availability has been sought by aiming for optimum solubility of ethylene in the vinyl acetate monomer. Thus British Pat. No. 1,117,711 (June 19, 1968) teaches first adding all the vinyl acetate to the aqueous emulsion phase, agitating this phase thoroughly in contact with pressurized ethylene gas "to effect solution of the ethylene in vinyl acetate up to the substantial limit of its solubility" while heating to the desired temperature of polymerization, and only after completion of this first homogenization stage, then adding initiator to commence polymerization. According to the examples of that patent, copolymers containing 20 percent of ethylene were obtained using ethylene pressures in excess of 500 p.s.i. It has furthermore been found by the instant applicants that when the ethylene pressure is reduced to 150 p.s.i., that procedure is incapable of attaining an ethylene content higher than about 5 percent.

In contrast to that earlier procedure, the method of this instant invention requires no preliminary homogenization step. It is actually preferred to add the initiator first, whereby polymerization commences practically instantaneously upon addition of the first increment of vinyl acetate.

Instead of depending on the presence of high amounts of vinyl acetate to bring more ethylene into the polymerization zone, this invention aims at the opposite condition of keeping the amount of free vinyl acetate as low as practically feasible.

The applicants have made studies of the ethylene content of copolymers resulting from emulsion copolymerizations in the presence of various levels of free vinyl acetate. In a series of experimental runs vinyl acetate was gradually added during polymerization at a rate substantially equal to the rate of polymerization. The experiments were carried out at the same temperature and pressure but differed from each other in that the concentration of free vinyl acetate was at different levels. It was found that the proportion of ethylene copolymerized with vinyl acetate was substantially the same regardless of whether the level of vinyl acetate monomer was at 6 percent or at concentrations as high as 50 percent corresponding to the commencement of a batch process. However, when the level of vinyl acetate maintained during gradual addition thereof was reduced to less than about 3.5 percent of the aqueous phase it was unexpectedly found that the ethylene incorporated into the copolymer was dramatically increased. At 150 p.s.i. and 30° C. it was found, for example, that the ethylene content was increased from about 5 percent to greater than 15 percent when the level of vinyl acetate monomer during polymerization was changed from 6 percent to below 3 percent. Experience has shown moreover, as also illustrated by a comparison of several of the examples given further below, that the ethylene incorporated into the copolymer at any particular pressure begins to rise when the free vinyl acetate is reduced below about 3.5 percent and continues to rise as the free vinyl acetate is further reduced. As to the lowest level of free vinyl acetate permissible, this is limited only by the practical restrictions inherent in keeping the rates of vinyl acetate addition and copolymerization equal, for which purpose said level is preferably not substantially less than about 0.1 percent.

The mechanism is not completely understood whereby copolymerization occurs between ethylene entering an aqueous emulsion polymerization zone as a gas and vinyl acetate entering therein as a liquid. However, it seems reasonable, in view of the results of this invention, to assume that the ethylene molecules and vinyl acetate molecules polymerizing in the particles may reach the sites of polymerization by different paths and with different rates of diffusion and that at low free vinyl acetate content the availability of ethylene at the polymerization sites is relatively favored, thereby yielding the unexpectedly high ethylene content in the copolymer. This theoretical interpretation is an attempt to explain the unpredicted results of this invention and the applicants do not wish to be limited in any way thereby.

The emulsion copolymerization of this invention can be carried out in the usual types of reactors known to those familiar with the art and constructed so as to withstand safely the range of pressures applied. Such reactors are equipped with various accessories including heating jackets, means of agitation and means of both slugwise and gradual metered addition of reactants. Procedures will be illustrated in examples given further below.

A major feature of the instant invention is in keeping the level of vinyl acetate below a threshold of about 3.5 percent and preferably not exceeding 1 percent by weight of the aqueous emulsifying composition. For best results it is preferred to maintain such a condition throughout the entire duration of copolymerization. Proceeding in such manner, the free radical donating system used to initiate copolymerization is added to the aqueous ethylene-pressurized emulsifying medium prior to the addition of any vinyl acetate. The vinyl acetate is then added gradually, as through a pumping system, at a rate sufficiently slow to maintain the level of unreacted vinyl acetate at less than about 3.5 percent and preferably not more than about 1.0 percent by weight of the aqueous composition. However, benefits of this invention can be obtained by carrying out only a major portion of the total copolymerization in this manner, preferably greater than 70 percent and particularly greater than 85 percent of the total copolymerization.

It is of course possible to modify the rate of copolymerization in this invention by the usual means such as by change in temperature or in the concentration of free radical initiator molecules. The faster the rate of polymerization, the more rapidly may the vinyl acetate monomer be added without preventing maintenance of the low level of free vinyl acetate required to obtain the benefits of this invention.

A variation in preparing copolymer according to the method of this invention is to carry out the copolymerization in the presence of a compatible seed latex. Such seed latex can be a vinyl acetate/ethylene copolymer latex separately and previously prepared using the procedure of the instant invention substantially throughout the entire extent of the vinyl acetate addition. This previously prepared latex can conveniently contain between about 40 and 60 percent solids and can be added to the aqueous emulsifying composition in amount so as to constitute between about 5 and about 25 percent of the total copolymer to be obtained in the final product of the seeded run.

The aqueous emulsion comprising the diluted seed latex can contain additional surfactant if desired and additional surfactant can be added during the ensuing copolymerization. As in the above-described procedure not using a preformed seed latex, the free radical donating system used to initiate copolymerization is added to the aqueous ethylene-pressurized emulsifying medium prior to the further addition of any vinyl acetate monomer. The vinyl acetate is then added gradually at a rate sufficiently slow to maintain the level of unreacted vinyl acetate at less than about 3.5 percent and preferably not more than about 1.0 percent by weight of the aqueous medium.

Successive runs using this last-mentioned procedure can be made wherein each run of the series uses a fraction of the product of the preceding run as its seed. Inasmuch as all the runs of such a series, including the first, can be made by the procedure of this invention (namely, maintaining the vinyl acetate from beginning to end of each run below a threshold of 3.5 percent by weight of the aqueous emulsifying composition) the fraction of seed latex used on total polymer of each run is not critical as far as obtaining the desired high level of ethylene content is concerned. For economical reasons, however, and for better control of particle size, it is preferred that no more than 10–15 percent of total vinyl acetate in a completed run be contained in the seed latex of that run.

It is possible also to carry out the procedure of this invention in the presence of a seed latex first prepared in situ by the so-called "batch" process whereby between about 5 and 25 percent of the total amount of vinyl acetate to be used in the completed run is first added to the aqueous emulsifying composition in one "slug" or portion. Since the initial free vinyl acetate is then above 3.5 percent by weight of the aqueous emulsifying composition, part of the batch copolymerization will then not be carried out with the benefits of the instant invention. When the remaining unpolymerized vinyl acetate is below at least about 3.5 percent, preferably about 1 percent, the remaining vinyl acetate can then be copolymerized according to the method of the instant invention, using a procedure similar to that described above with the use of a separately preformed seed latex. When using an in situ latex, it is preferred that no more than about 10 to 15 percent of the total vinyl acetate be taken for the preparation of the seed latex.

The procedure of this invention can be used under any practically feasible pressure of ethylene. It can be used to increase the amount of ethylene copolymerized with vinyl acetate at any particular pressure. The level of ethylene content which has been of chief interest to the instant inventors has been in the range of between about 5 and 40 percent ethylene, this range being specially suitable in copolymers to be used in formulation of water-based adhesives and paints. In particular, the preferred range for such use is between about 10 and 25 percent ethylene in the copolymer. The usefulness of the latexes of this invention will be particularly illustrated in regard to their formulation into adhesives and paints. In the preparation of such specially preferred latexes it is particularly advantageous to be able to use ordinary reactors with lower demand upon the pressureproof nature of the equipment. Hence chief attention in this disclosure is given to reactions carried out at pressures ranging from about 30 to about 1,000 p.s.i., preferably at pressures not substantially above 500 p.s.i., and more especially in the range from 40 to 250 p.s.i.

As to temperature, the method of this invention works quite well over the range between 0° C. and 70° C., the higher temperatures having the advantage of higher copolymerization reaction rates with consequently lower necessary times for residence in the reaction equipment, and the lower temperature having the advantage of increasing the availability of ethylene in the aqueous emulsifying composition. The preferred conditions which effect a reasonable compromise between these respective advantages cover a temperature of 20°–50° C. in particular when working at a pressure of between 30 and 250 p.s.i.

As to constituents comprising the aqueous emulsifying composition, these can be any of the surfactants and colloid stabilizing agents customarily used in effecting emulsion polymerization. Surfactants of the nonionic and anionic types are preferred and in particular sodium lauryl sulfate as exemplified by the commercially available materials known as Sipon WD and Duponol-WAQE; and nonylphenoxy poly (ethyleneoxy) ethanols, such as the Igepals, including the full range of ethylene oxide contents available and designated commercially by various numbers ranging from Igepal CO–530 to Igepal–890. Of these, Igepal CO–710 has been found particularly useful. An anionic surfactant available commercially as Abex 18S has been found particularly useful in that it has low foaming tendencies thereby contributing effectively to the end properties of product latex when formulated in applications such as paints. Sulfosuccinates such as the well-known Aerosol OT are also effective. Sodium and ammonium salts of sulfate esters of an alkyl phenoxy poly (ethyleneoxy) ethanols such as the commercially available Alipal CO–433 and Alipal CO–436 also are useful, as are condensates of ethylene oxide with hydrophobic bases formed by condensing propylene oxide with propylene glycol such as are available commercially under the proprietary name Pluronics.

As will be evident to those trained in the art of emulsion polymerization, various other types of surface active agents can be applied and also certain surfactants can be used in combination to obtain a particular balance of properties. Thus the surfactant can be chosen in accordance with skillful practice to obtain particular combinations of end properties desired.

As to amounts, surfactants can be used in the usual proportions well established in the art of emulsion polymerization, the preferred range being from 0.5 to 5 percent based on the weight of aqueous emulsifying phase and the particular amount and addition schedule being chosen such as to control particle size and eventual stability of the product latex. Surfactants can be introduced into the aqueous composition initially or gradually during the period of simultaneous gradual addition of vinyl acetate.

The aqueous emulsifying composition in this invention can also include various colloid stabilizing agents known in the art of emulsion polymerization. Among colloids which can be used are polyvinyl pyrollidone, hydrolyzed starches and hydroxy ethyl starches, hydroxy ethyl cellulose, carboxymethyl cellulose, polyvinyl alcohols of both "completely hydrolyzed" and "partially hydrolyzed" types, casein, gelatin, and various natural gums as gum acacia or gum arabic. Amounts to be used of such agents will depend, as is known, upon the nature of any surfactant also present and upon the viscosity desired. Between about 0.1 percent and 5 percent by weight of total latex solids is preferable. Between about 0.2 percent and 1 percent is often suitable.

In addition to the named monomers used to make the vinyl acetate ethylene copolymers of this invention, small amounts up to about 10 percent and suitably up to about 3 percent of a functional reactive comonomer can be included. Such comonomers may provide polar groups to assist adhesion of the vinyl acetate ethylene copolymer to the substrate to which it will eventually be applied or they may have the function of providing means for cross-linking and thus contribute to strengthening and making more resistant the adhesive bond. Such coreactive functional monomers can include carboxy compounds such as acrylic acid, methacrylic acid, itaconic acid, aconitic acid, maleic acid, fumaric acid, and the dimer of methacrylic acid. In the case of polycarboxylic monomers the low alkyl monoesters of these acids are also suitable such as mono-methyl maleate, mono-ethyl fumarate, and mono-butyl itaconate. Functional reactive monomers can also be chosen from the vinyl esters of polybasic acids such as divinyl adipate, divinyl succinate, and divinyl itaconate; from allyl esters of polyfunctional acids such as diallyl fumarate, triallyl cyanurate, and diallyl vinyl citrate; other funtional comonomers are divinyl ether and diallyl ether. Postreactive types of cross-linking comonomers include glycidyl compounds such as glycidyl acrylate, glycidyl methacrylate, glycidyl vinyl ether, and glycidyl allyl ether; also N-alkylol compounds such as N-methylolacrylamide, N-methylol methacrylamide, and N-ethylol acrylamide.

The free radical donating initiator of this invention can be selected from any of the initiators for aqueous emulsion copolymerization known in the art including those which undergo scission under the influence of heat and those which are caused to form free radicals by reaction with reducing agents. Water-solubie type initiators are usually to be preferred including potassium persulfate, sodium persulfate, ammonium persulfate, hydrogen peroxide, and others which will be known to those skilled in the art. When reducing agents are used it is again preferred to use materials which are water soluble such as sodium formaldehyde sulfoxylate, sodium metabisulfite, and ascorbic acid. The amounts to be used will depend upon the rate of polymerization desired and upon other factors which are well known in the art. Preferably, the aqueous emulsifying composition contains between about 0.1 percent and 5 percent, especially from 0.2 to 2 percent by weight of the initiator. If a reducing agent is used, it also is used in amount totaling between about 0.1 percent and 5 percent, especially from 0.2 to 2 percent by weight of the finished latex.

The invention will be further illustrated by description in connection with the following specific examples of the practice of it, wherein proportions are in parts by weight unless stated otherwise, and wherein the values reported for the ethylene content of the resultant copolymers were obtained by direct quantitative elemental analysis of the carbon content.

EXAMPLE 1

The following materials were added to a 10-gallon stainless steel reactor provided with a propeller agitator: 37.7 parts by weight of deionized water, 0.2 parts of sodium bicarbonate and 0.53 parts of potassium persulfate, and purged of air. The reactor was then pressurized with 150 p.s.i. of ethylene. The temperature was maintained throughout at 30° C.±1°.

A solution was prepared containing 0.060 parts sodium metabisulfite in 0.26 parts of deionized water. One-sixth of this solution was added to the reactor and there was then begun a simultaneous pumping over a period of 11 hours of 53.0 parts vinyl acetate monomer and, in a separate stream, a solution of 2.12 parts Igepal CO-710, 1.54 parts Abex 18-S, (34.5 percent aqueous solution), 0.49 parts sodium metabisulfite in 3.72 parts of deionized water. Since the initiating persulfate free radicals were already present before the addition of any vinyl acetate, polymerization commenced almost simultaneously with the start of vinyl acetate addition and no period elapsed for the saturation of vinyl acetate with ethylene. Over the course of the first 25 minutes, the remaining sodium metabisulfite solution was added in five equal increments.

At approximately 20-minute intervals throughout the addition period, small samples of the liquid phase were removed from the reactor through a cold pressure trap to which polymerization-inhibiting hydroquinone had been added. The free vinyl acetate monomer was determined by quantitative distillation from a weighed sample, this method having been standardized by a procedure of direct bromine titration. The data obtained on the latex of the present example showed free vinyl acetate throughout to be less than 1 percent by weight of the liquid (latex) sample. The average level of free vinyl acetate was less than 0.5 percent for the overall run.

The level of vinyl acetate is estimated to have been maintained at not greater than 3.0 percent by weight of the aqueous emulsion phase throughout the addition period. Throughout the addition period the pressure was maintained at 150 p.s.i. in the reactor and the temperature was kept within one degree of 30° C. After addition was complete, agitation was continued for 30 additional minutes under the same conditions of pressure and temperature.

The resultant latex had a solids content equal to 57.5 percent and 0.6 percent residual vinyl acetate monomer and colloidal stability and other properties were excellent. Average particle diameter by electron microscopy was 0.35 microns. The percent ethylene was determined by chemical analysis to be 11.1.

EXAMPLE 2

A paint was made by adding the following materials to 240 parts by weight of the latex of Example 1.

|  | Parts by Weight |
|---|---|
| Natrosol 250 HR, 2% solution (Hydroxy ethyl Cellulose) | 250 |
| Nopco NDW (Proprietary Defoaming Agent) | 2 |
| Tamol 731 (Sodium salt of carboxylated anionic surface -active agent) | 8 |
| Igepal CO-610 (Nonyl phenoxy polyoxyethylene ethanol) | 4 |
| Ethylene glycol | 30 |
| R & R 551 (Proprietary Interface Modifier) | 3 |
| TiPure R-610 (Titanium dioxide) | 200 |
| Celite 281 (Diatomaceous Silicate) | 25 |
| Satintone No. 1 (Aluminum Silicate) | 50 |
| Snowflake White (Calcium Carbonate) | 200 |
| Phenylmercuric Acetate (18% Hg content | 0.3 |
| Water | 163 |

This paint showed excellent color development when mixed with tinting pigments. This paint also proved to have very good physical stability.

Films of this paint were cast on standard scrub test panels as specified by ASTM Standard D-2486, the panels having been previously primed as customary with a good quality alkyd primer. Casting was done with a 6-mil Bird applicator of 3-inch width. In addition to the film of the paint of this example a second comparison film was cast in parallel on the same panels. Comparison films corresponded to paints made according to the above formula excepting that the latex of Example 1 was replaced respectively by a commercial "vinyl acrylic" latex, and two commercial ethylene/vinyl acetate latexes. One such set of films was cast at 75° F. and allowed to dry at 75° F. and 50 percent R.H. for 48 hours. A second set of films was cast at 40° F. and allowed to dry at 40° F. and 50 percent R.H. for 48 hours. The paint of this example showed excellent hiding power as compared to the paints from commercially available latexes.

Approximately 4.5 inches of the entire width of each washability panel was then coated with a spar varnish, which was subsequently allowed to dry for a period of 24 hours at 75°±3° F. and 50 percent R. H. to provide a total drying time of 72 hours for the test film.

Scrub tests were carried out on a straight line Gardner Washability Machine with the holder and bristle brush designed by Gardner, using cake LAVA soap as the abrasive. The test was continued until 0.25 inch of the substrate was completely bared. The number of cycles to failure was recorded. The results of the tests are summarized in the following table.

| Polymer | Temperature of Casting & Original Drying | Strokes to Failure 40° F. |
| --- | --- | --- |
| Commercial "Vinyl Acrylic" | 975 | 70 |
| Commercial Ethylene Vinyl Acetate | 730 | 50 |
| 2nd Commercial Ethylene Vinyl Acetate | 1,250 | 90 |
| Ethylene-Vinyl Acetate of Example 1 | 1880 | 950 |

These results show considerable superiority in the scrub resistance of the paint using the latex of the instant invention.

Using the vinyl acrylic as the comparison paint, scrub resistance is hereinafter reported as a ratio, which is then calculated to 1,880/975=1.93 at 75° F. for the paint comprising the latex of this invention, Example 1. Repeated tests have demonstrated that this ratio of scrubs for two identical paints on the same panel remains substantially constant from test to test. The corresponding characteristic ratio for performance at 40° F. is then 950/70=13.5. The high values obtained for films cast at the lower temperature are particularly significant because they indicate excellent performance of paint applied under adverse weather conditions.

EXAMPLE 3

This example illustrates a modification in polymerization procedure including the preliminary formation of seed latex in situ followed by gradual addition of components as in Example 1. This procedure does not obtain the benefits of the instant invention until the level of the vinyl acetate is reduced to below about 3.5 percent.

The same quantity of water, sodium bicarbonate and potassium persulfate as used in Example 1 were added to the reactor and in addition there were added 0.21 parts of Igepal CO-710 and 0.15 parts of Abex 18S concentrate and 5.30 parts of the vinyl acetate. (This corresponded to 0.4 percent and 0.1 percent of the respective surfactants based on weight of total vinyl acetate). Immediately after purging and pressurizing with 150 p.s.i. of ethylene at 30° C. a mixture of 0.012 parts sodium metabisulfite in 0.052 parts deionized water was added to initiate polymerization of the seed. At 5-minute intervals, four additional increments of 0.012 parts sodium metabisulfite in 0.052 parts water were added. Simultaneous pumping of vinyl acetate monomer and other components as described in Example 1 was then started, a total amount of 47.7 parts vinyl acetate being added over a period of 11 hours. During this period all analyses of free vinyl acetate showed less than 1 percent. The second stream simultaneously added over the same period of time was composed of a 1.91-part Igepal CO-710, 1.39 parts of a 34.5 percent aqueous solution of Abex 18S, 149 parts sodium metabisulfite and 3.72 parts deionized water. (These amounts of surfactant corresponded respectively to 4 percent and 0.1 percent on the weight of gradually added vinyl acetate). Again the pressure of ethylene was maintained at 150 p.s.i. throughout and the temperature was kept within 1° of 30° C.

A small quantity of additional potassium persulfate was added to insure low residual monomer. The product latex contained 59.1 percent solids, was colloidally stable, residual vinyl acetate monomer content equal to 0.3 percent of total latex, and ethylene content equal to 10.8 percent. Particle size expressed as average diameter obtained with electron microscope was 0.25 microns. Standard scrub resistance tests on a paint made as described in Example 2 showed a ratio calculated as above described, equal to 1.5 at 75° F. and 9.7 at 40° F.

EXAMPLE 4

This example illustrates a modification using a preformed latex seed. Since this seed is prepared entirely by the method of this invention, the entire product of this example is made with the benefits of the instant invention.

The reactor was charged according to the procedure of Example 3 except that 10 parts of a preformed ethylene vinyl acetate latex made by the procedure of Example 1 were used in place of the vinyl acetate monomer and surfactant. Simultaneous pumping was then carried out as described in Example 3. Free vinyl acetate averaged about 0.5 percent for the full run and was well under 3.5 percent throughout, using the same amounts of vinyl acetate, surfactants and sodium metabisulfite as stated in Example 3. The latex obtained was colloidally stable, had 59 percent solids of a copolymer analyzing 12.0 percent ethylene and an average particle size equal to 0.40 microns. Paint tests made according to the procedure of Example 1 showed 1.6 ratio for scrub resistance at 75° F.

EXAMPLE 5

The procedure of Example 1 was followed excepting that the Igepal CO-710 was replaced by 1.06 parts of Sipon WD. and the Abex 18-S content was increased to 2.31. Free vinyl acetate was held below 1 percent for over 80 percent of the polymerization and averaged about 0.7 percent for the full run. A stable latex of solids content 57.5 percent was obtained. Analysis of the recovered copolymer corresponded to 16.7 percent ethylene, residual vinyl acetate monomer was 0.5 percent. Particle diameter of the latex averaged 0.15 microns. Scrub tests on standard paint carried out as in Example 2 yielded ratio values 2.68 at 75° F. and 26.7 at 40° F.

EXAMPLE 6

The polymerization procedure of Example 3 was followed except that the initially added Igepal and Abex were replaced by 0.08 parts of Sipon WD and the gradually added surfactants were replaced by 0.98 parts Sipon WD and 2.31 parts of Abex 18S (34.5 percent aqueous solution). After the initial charge of vinyl acetate was polymerized, free vinyl acetate was held below 1 percent throughout the remainder of the run. The resultant stable latex had solids content 58.6 percent, residual vinyl acetate monomer less than 0.1 percent and a particle size 0.20 microns. The percent ethylene found by analysis in the copolymer was 15.2 percent. The standard paint scrub resistance tests gave ratio values of 2.6 at 75° F. and 13.8 at 40° F.

EXAMPLE 7

The procedure of Example 4 was followed except that the amount of Sipon WD and Abex 18S, added gradually, were as in Example 6. The resultant stable latex contained 0.1 percent residual vinyl acetate monomer and average particle size 0.16 microns. The ethylene found by analysis in the copolymer was 16.2 percent. Standard paint tests yielded 2.1 at 75° F. Vinyl acetate monomer was maintained at less than 3.5 percent throughout the run.

EXAMPLE 8

Using the composition of Example 6, a series of latexes was prepared by the basic procedure of Example 6 excepting that the temperature was maintained respectively at 20° C., 30° C., 40° C. and 50° C. The pressure was 150 p.s.i. in each run. The following results were obtained.

| Copolymerization run | Temperature of copolymerization, °C. | (Hours) VAc addition time | Percent, solids | Residual percent VAc | Percent ethylene in polymer | Standard paint Scrub, 75° F. | Test, 40° F. |
| --- | --- | --- | --- | --- | --- | --- | --- |
| A | 20 | 9 | 59.3 | 0.1 | 15.0 | 1.66 | 11.2 |
| B | 30 | 9 | 57.5 | 0.1 | 13.9 | 2.57 | 9.6 |
| C | 40 | 9 | 56.6 | 0.2 | 13.0 | 1.57 | 6.3 |
| D | 50 | 9 | 56.2 | 0.1 | 11.4 | | |

EXAMPLE 9

A latex was prepared using the procedure and composition of Example 5 excepting that 0.265 parts of sodium vinyl sulfonate was added gradually simultaneously with the other streams. Vinyl acetate free monomer was maintained below 2 percent throughout the run. The product copolymer was found by analysis to contain 12.6 percent by weight ethylene. Paint tests showed scrub resistance factors of 2.1 and 18.9 respectively at 75° F. and 40° F. The latex had excellent shelf stability at 57.4 percent solids, particle size equal to 0.15 microns, and 0.4 percent residual vinyl acetate monomer.

EXAMPLE 10

A latex was prepared using the procedure and composition of Example 5 excepting that the gradually added surfactant was replaced by 2.65 parts of a partially hydrolyzed polyvinyl alcohol, added as a 20 percent solids aqueous dispersion and that sufficient water was used to dilute the product to 54.8 percent solids. The ethylene content of the copolymer was found to be 11.8 percent. The latex had an average particle size equal to 0.45 microns and was found to be particularly effective as a vinyl adhesive.

The latex of this example was tested as an adhesive between cotton cloth and vinyl film. The latex was cast on vinyl film using a Gardner knife at 15 mils aperture. A swatch of unsized cotton cloth was then placed on the wet film and lightly smoothed to give bubble-free lamination. The laminate was air-dried and cut into strips 1 inch wide. The vinyl film was peeled from the cloth in a Tinius-Olsen Universal Testing Machine at the rate of 2 in./min. The average peeling force over a 5-inch length was found to be 6.8 lb. By contrast a latex prepared at the same pressure but without the benefit of the instant invention had only 4.5 percent ethylene incorporated in the copolymer and showed an average peeling force in the adhesion test equal to only 1.4 lb.

EXAMPLE 11

A series of latexes is prepared using the procedure of Example 1, excepting that there is also added gradually during the 11-hour addition period 0.58 parts of a functional monomer, said monomer being respectively acrylic acid, N-methylolacrylamide and triallyl cyanurate. Vinyl acetate free monomer is maintained at less than 3.0 percent throughout. In each case the copolymer obtained has an ethylene content in the range 11–21 percent.

EXAMPLE 12

To illustrate the importance of free vinyl acetate level in carrying out the method of this invention, the conditions of Example 5 were repeated except that the vinyl acetate was added too rapidly relative to the rate of polymerization, so that the free vinyl acetate averaged 5.4 percent. Chemical analysis showed that the copolymer of this example which was not made according to the method of this invention contained only 5.6 percent ethylene as compared to 18.2 percent found in Example 5.

EXAMPLE 13

A series of runs was made following the procedure of Example 6, but using pressures respectively equal to 75, 100, 125 and 150 p.s.i. Vinyl acetate free monomer was maintained at less than 3.5 percent throughout. The ethylene content of the resultant copolymers was respectively 7.6 percent, 11.0 percent, 13.8 percent and 15.2 percent, illustrating the increase in ethylene content as the pressure is increased.

EXAMPLE 14

A copolymerization was carried out at 150 p.s.i. and the same overall composition as in Example 1, but not using the procedure of the present invention. All of the vinyl acetate and surfactant was included in the initial stage. More than 45 minutes was allowed for equilibration, with agitation, of the ethylene in the mixture before adding the initiator. The resulting copolymer contained only 5.2 percent ethylene as compared to the 11.1 percent obtained in Example 1 using the procedure of this invention. Also a paint made according to the procedure of Example 2 had scrub resistance ratio of less than 1.0 regardless of whether the paint was cast at 75° F. or 40° F., in contrast to the superior properties described above for the paint made with the latex of Example 1.

EXAMPLE 15

A copolymerization was carried out according to the procedure of Example 14, excepting that the pressure was increased to 500 p.s.i.

Under the prior art conditions using equilibration but not using the controlled level of vinyl acetate free monomer characteristic of the instant invention, only 15.6 percent ethylene was incorporated at the higher pressure, a result not substantially different from that obtained in Examples 6 or 7 using the method of the instant invention at only 150 p.s.i.

EXAMPLE 16

A series of polymerizations is carried out following substantially the same procedure as in Example 5 except that the pressure is changed successively to 250 p.s.i., 500 p.s.i. and 750 p.s.i. The level of free vinyl acetate monomer is maintained at less than 3.5 percent throughout the addition period. Copolymer is obtained containing an amount of ethylene significantly higher than that possible with the methods of the prior art. The ethylene content at 750 p.s.i. is in excess of 40 percent.

It will be understood that it is intended to cover all changes and modifications of the examples of the invention herein chosen for the purpose of illustration which do not constitute departures from the spirit and scope of the invention.

What is claimed is:

1. A method of preparing a stable latex of a copolymer of vinyl acetate with ethylene, said method comprising:
   a. maintaining ethylene under a pressure of at least 30 p.s.i. on an aqueous emulsifying composition containing a free radical donating initiator;
   b. adding vinyl acetate to said emulsifying composition to cause copolymerization of vinyl acetate and ethylene therein; while
   c. maintaining the quantity of unpolymerized vinyl acetate in said emulsifying composition at not more than about 3.5 percent by weight of composition during the preparation of a major portion of said copolymer.

2. The method of claim 1 wherein said aqueous emulsifying composition contains a latex, prior to said addition of vinyl acetate to said emulsifying composition, said latex prepared by the method of claim 1, the quantity of said latex being sufficient to provide between about 5 percent and about 25 percent of the total copolymer in the final product.

3. The method of claim 1 wherein the latex is prepared in two steps by first adding to the aqueous emulsifying composition, in one portion, vinyl acetate corresponding to between about 5 percent and 25 percent of the total amount of vinyl acetate used in the completed preparation, and copolymerizing this vinyl acetate with ethylene to form a latex and secondly by continuing the copolymerization of vinyl acetate with ethylene under the conditions of claim 1.

4. A method of preparing a stable latex of a copolymer of vinyl acetate with ethylene, which method comprises maintaining ethylene pressure of between about 30 and about 1,000 p.s.i. on contact with an aqueous emulsifying phase, adding to said phase a free radical donating initiator, maintaining the temperature of said emulsifying phase between about 0° and 70° C. and then gradually adding thereto vinyl acetate at a rate such as to maintain the concentration of unpolymerized vinyl acetate at a level not exceeding about 3.5 percent by weight of the aqueous emulsion phase during the addition of said vinyl acetate.

5. A method of preparing a stable latex of a vinyl acetate ethylene copolymer containing up to about 20 percent ethylene by weight of copolymer, which method comprises maintaining about 145–155 p.s.i. ethylene pressure in contact with an aqueous emulsifying phase, adding a free radical donating initiator to said emulsifying phase, maintaining, said emulsifying phase at a temperature between about 20 and 30° C., and then gradually adding vinyl acetate to said emulsifying phase at a rate to maintain the concentration of unpolymerized vinyl acetate at a level not exceeding about 3.5 percent by weight of the aqueous emulsion phase while simultaneously polymerizing said ethylene with the vinyl acetate.

* * * * *